United States Patent [19]
Aoki

[11] 3,844,643
[45] Oct. 29, 1974

[54] AUDIO-VISUAL CARTRIDGE AND PLAYER

[76] Inventor: Teiji Aoki, 23-10, Daida-2, Setagaya-ku, Tokyo, Japan

[22] Filed: Mar. 16, 1973

[21] Appl. No.: 342,194

[30] Foreign Application Priority Data
Mar. 21, 1972 Japan............................. 47-27466
Apr. 15, 1972 Japan............................. 47-37974
May 20, 1972 Japan............................. 47-59299
June 6, 1972 Japan............................. 47-55671

[52] U.S. Cl. ................. 352/78 R, 352/17, 352/24, 352/31
[51] Int. Cl. ............................................ G03b 23/02
[58] Field of Search ........ 352/78 R, 24, 17, 31, 239

[56] References Cited
UNITED STATES PATENTS

| | | | |
|---|---|---|---|
| 2,052,792 | 9/1936 | Owens | 352/24 |
| 2,725,785 | 12/1955 | Templin | 352/24 |
| 3,389,953 | 6/1968 | Gerry | 352/78 R |
| 3,498,703 | 3/1970 | Gerry | 352/31 |
| 3,547,529 | 12/1970 | Anthes | 352/31 |
| 3,692,390 | 9/1972 | Siegel | 352/31 X |
| 3,692,392 | 9/1972 | Brill | 352/78 R |

*Primary Examiner*—Monroe H. Hayes
*Attorney, Agent, or Firm*—Hill, Gross, Simpson, Van Santen, Steadman, Chiara & Simpson

[57] ABSTRACT

A film cartridge having a film to be projected, a magnetic tape with a sound signal and film feeding signals, a housing for accommodating therein the film and tape separately therein, a reflector for projecting light passing the film and a locking mechanism for locking the film when it is not driven.

A cartridge autoslide or player for the film cartridge mentioned as above having a housing with an opening for receiving the cartridge, a light source for projecting light on to the reflector of the film cartridge, an optical device for projecting the light passed through the film onto a screen, a film driving mechanism, a tape driving device and an unlocking mechanism for automatically unlocking the film locking mechanism when the cartridge is inserted into the autoslide.

9 Claims, 19 Drawing Figures

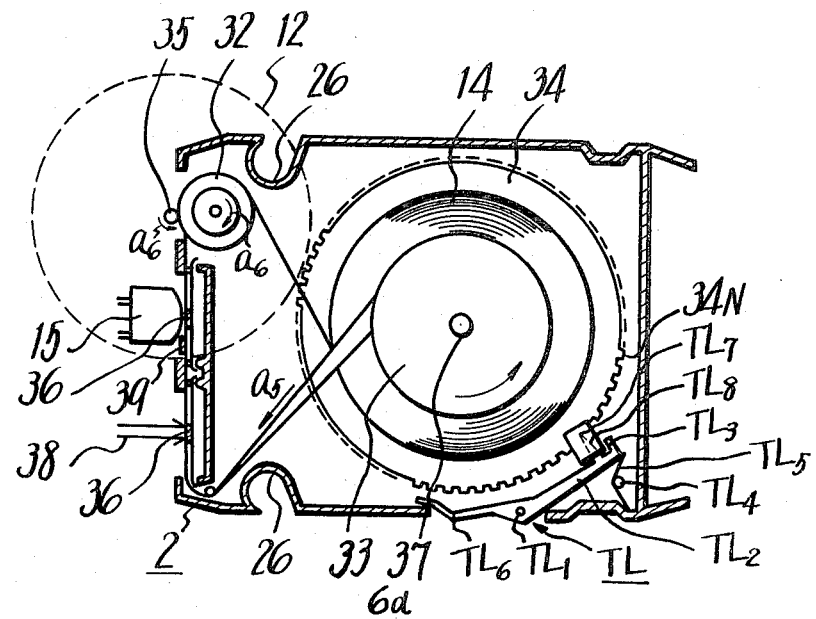
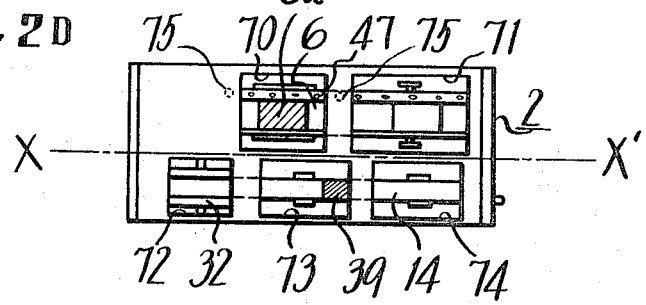
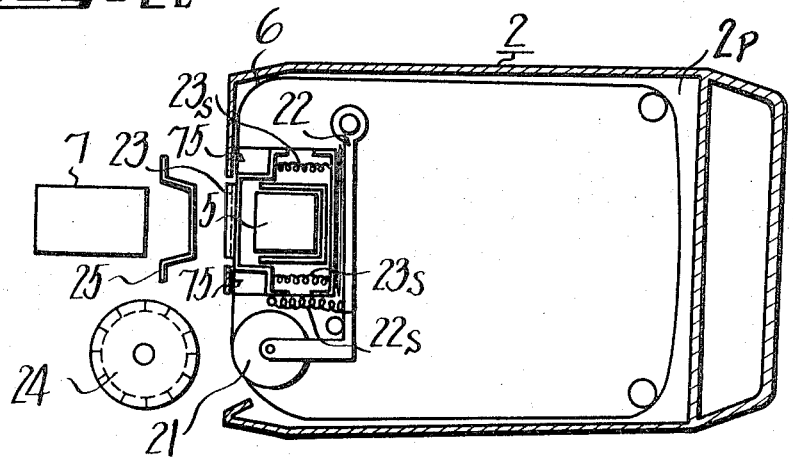

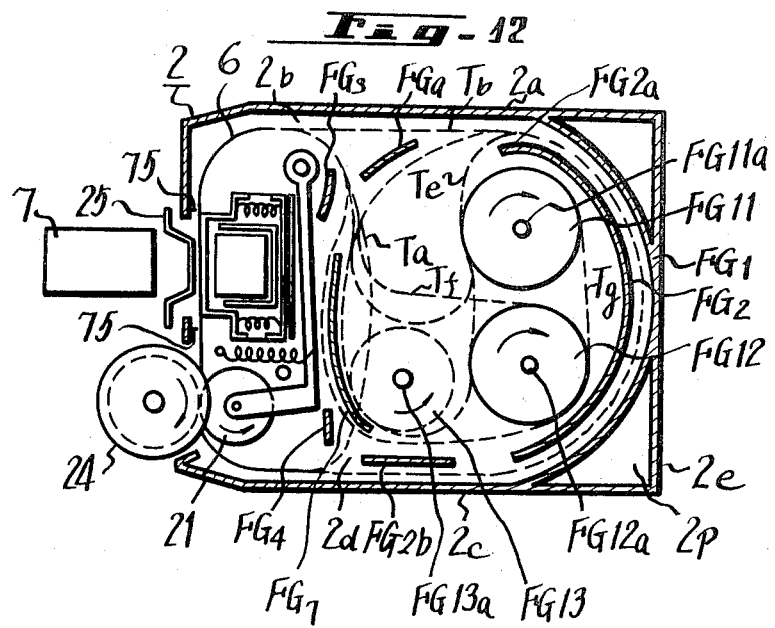
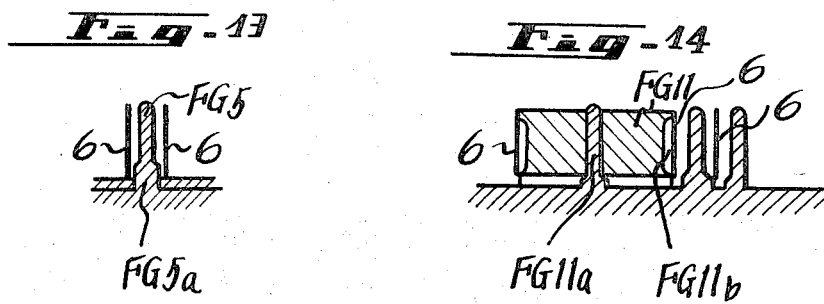

AUDIO-VISUAL CARTRIDGE AND PLAYER

BACKGROUND OF THE INVENTION

1. Field of the Invention

This invention relates generally to a cartridge, and more particularly to a cartridge having a film for projection and a magnetic tape having recorded thereon an aural and synchronizing signal source.

This invention further relates to an autoslide or player for use with the above cartridge, and more particularly to an autoslide or player for the cartridge which is capable of projecting a picture recorded on the film of the cartridge on a screen and, at the same time, reproducing an aural signal related to the picture being projected.

2. Description of the Prior Art

Conventional types of autoslides in which a signal is recorded, on one track of a magnetic tape and an aural signal is recorded on the other track in synchronism therewith and pictures on a slide film are automatically projected in a sequential order, employ as a picture source a 35 or 16 millimeter film and as an aural and synchronizing signal source and open reel type tape recorder, a cassette tape recorder or an endless tape cartridge. Further, a cartridge, which has housed therein a slide film and a magnetic tape and is adapted to be mounted in or removed from the autoslide with one operation, has also been proposed but film and magnetic tape translation is usually in a vertical direction. Therefore, the cartridge is large as compared with resolution of the film and the magnetic tape often gets tangled due to essential defects resulting from vertical travel of the endless tape and, in addition, the synchronization of the picture and the sound is likely to be lost when the cartridge is mounted or removed from the autoslide, and the cartridge cannot be handled by children.

SUMMARY OF THE INVENTION

One object of this invention is to provide a cartridge which has enclosed therein a video film and a magnetic tape having recorded thereon aural and synchronizing signals and which is free from step out.

Another object of this invention is to provide a cartridge which has a mechanism for locking the film and the tape while not in use.

Another object of this invention is to provide a cartridge which has housed therein a tape having a signal indicating its start.

Another object of this invention is to provide a cartridge which has housed therein a film having a discrimination frame corresponding to the sensor of the tape.

Another object of this invention is to provide a cartridge which has a film guide in a flim housing portion.

Another object of this invention is to provide a cartridge which has an engaging depression for preventing an erroneous operation.

Another object of this invention is to provide a cartridge autoslide or player for driving the above-mentioned cartridge.

Another object of this invention is to provide a cartridge autoslide or player which has means for automatically releasing the film and tape locking mechanism of the cartridge.

Another object of this invention is to provide a cartridge autoslide or player which has means for supporting the cartridge in a manner to prevent its removal when in operation.

Another object of this invention is to provide a cartridge autoslide or player which has means for retaining the cartridge in position while in operation.

Still another object of this invention is to provide a cartridge autoslide or player which is designed to mount the cartridge in such a manner that the film traveling plane of the cartridge is substantially in parallel with the longer side of a screen.

The additional and other objects, features and advantages of this invention will become apparent from the following description taken in conjunction with the accompanying drawings.

BRIEF DESCRIPTION OF THE DRAWINGS

FIGS. 2A to 2E, inclusive, are schematic diagrams, partially in cross-section, for illustrating an example of a cartridge of this invention;

FIGS. 10, 11 and 12 are respectively top plane views of other examples for cartridges of this invention in which top covers are taken away; and FIGS. 13 and 14 are cross-sectional views of guides provided in the film cartridge portion.

DESCRIPTION OF THE PREFERRED EMBODIMENTS

Figure 1:
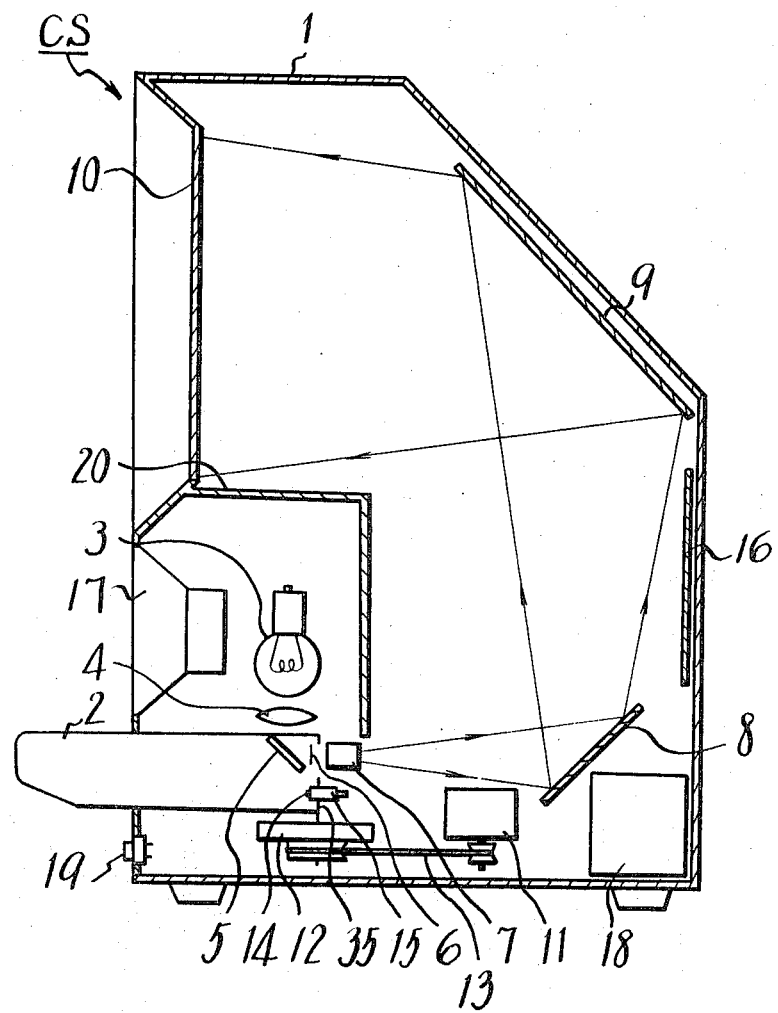
FIG. 1 is a schematic cross-sectional diagram for illustrating an example of a cartridge autoslide or player according to this invention with a cartridge mounted therein.

With reference to FIG. 1, a description will be given of a projection path and the construction of a cartridge autoslide or player CS. In the figure, reference numeral 1 indicates a housing of the cartridge autoslide CS, 2 a cartridge which is to be played or driven and which is inserted into the cartridge autoslide CS from the left in the figure, 3 is a light source such as a lamp which is provided in the housing 1, 4 a condenser lens disposed forwardly of the lamp 3, 5 a reflector such as a mirror disposed in the cartridge 2 for changing the direction of incident light, 6 is a slide film similarly disposed in the cartridge 2, 7 a projector lens disposed in the housing 1 forwardly of the film 6, 8 and 9 are reflectors such as mirrors disposed in the housing 1, and 10, is for example, a semitransparent internal projecting type screen (hereinafter referred to as a screen). Light from the light source 3 passes through a window of the cartridge 2, is reflected by the mirror 5 to pass through the film 6 and the lens 7 and is then reflected by the mirrors 8 and 9 to be projected to the screen 10. Accordingly, a picture recorded on the film 6 is projected onto the screen 10 and then is viewed from the left in the figure.

In this case, the screen 10 is a rectangular screen having an aspect ratio of, for example, 3 to 4 as usual and it is disposed crosswise. The cross-section of the screen 10 shown in the figure is the longitudinal shorter side and the transverse longer side perpendicular thereto is vertical to the sheet of the drawing. The reflectors 8 and 9 are also, for example, rectangular and disposed crosswise as is the case with the screen 10. In the figure, their shorter sides are shown respectively and their longer sides are perpendicular to the sheet of the drawing. As will be described later, the picture plane of the film 6 is composed so that the cross section perpendicular to the lengthwise direction shown in the figure is the vertical shorter side and the transverse longer side is along the lengthwise direction of the film perpendicular to the sheet of the drawing. Accordingly, in the case of projecting a picture on the film 6 to the screen 10, the reflectors 8 and 9 are disposed perpendicular to the sheet of the drawing as described above. On the contrary, where the cross section perpendicular to the lengthwise direction of the film 6 is the transverse longer side as usual, if the cartridge 2 is disposed with its upper surface (on the side of the light source) held horizontal so as to facilitate traveling of the magnetic tape which will be described later in the cartridge, it is necessary for projecting a sidelong picture on the screen 10 that the picture plane on the film 6 be turned by the reflectors 8 and 9 on the screen 10 through 90°. In this case, the reflectors 8 and 9 are not perpendicular to the sheet of the drawing but inclined at a certain angle thereto, so that reflector mounting mechanism is complicated and adjustment for turning the picture through 90° is very cumbersome.

In the present invention, the picture plane of the film 6 is composed so that its longer side is its traveling direction and its shorter side is perpendicular thereto. As compared with the case of conventional film picture plane, this invention has a great advantage in that it does not require the above-mentioned picture turning mechanism, and hence is free from troublesome adjustments.

In the figure, the cartridge 2 is shown so as to be disposed below the screen 10 but it may also be disposed above the screen 10, near the top of the housing 1 or loaded on the front of the housing 1 from the right or left side thereof, so long as the plane of travel of the film (the film is housed as an endless loop in the cartridge) is driven in its lengthwise direction to form a flat plane on the top surface of the cartridge 2 is parallel to the plane of travel of the film 6 and is parallel to the longer side of the screen 10.

A flywheel 12 is disposed in the housing 1 and is driven through a belt 13 by a motor 11 mounted in the housing 1. The rotary shaft of the flywheel 12, that is, a capstan 35 makes rotary contact with a tape pinch roller in the cartridge 2 to drive a magnetic tape 14 gripped therebetween as described later. The magnetic tape 14 is drawn across a magnetic head 15 disposed in the housing 1 at a position corresponding to the tape 14 and the aural and the synchronizing signals picked up by the head 15 are applied through an amplifier 16 to a speaker 17 to drive it and, at the same time, transport the film 6. Reference numeral 18 indicates a power source such, for example, as a power source transformer for power supply to the light source lamp 3, the motor 10 and the amplifier 16. Reference numeral 19 designates a start switch and 20 a shield plate for preventing the light from the light source 3 from leakage to the screen 10.

Figure 2A:
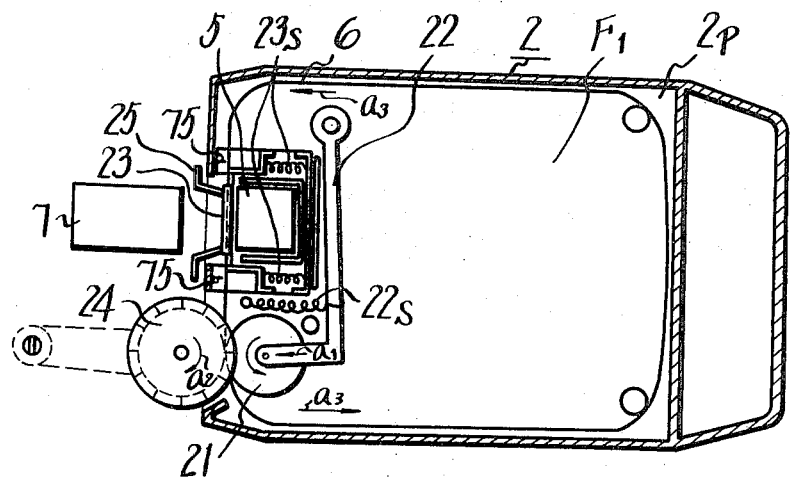
Figure 2B:
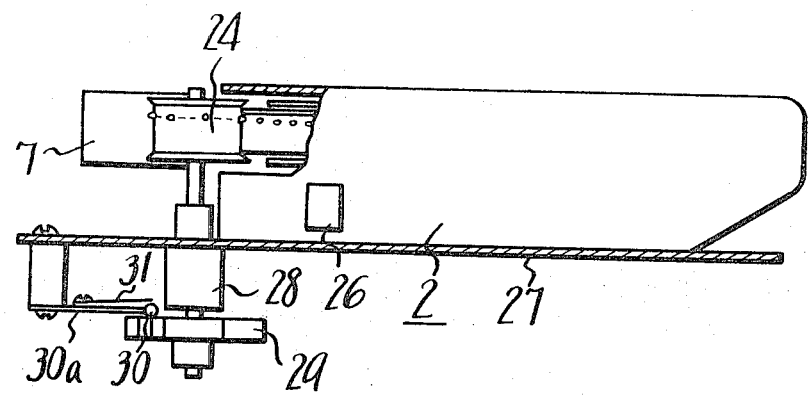
Figure 6:
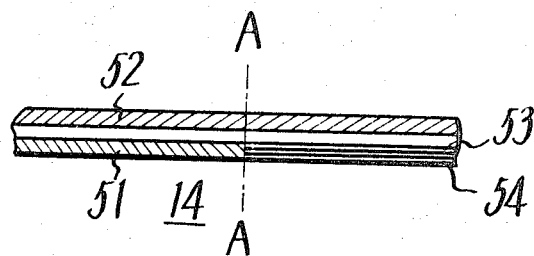
FIG. 6 is a front view of a magnetic tape housed in the cartridge.

Referring now to FIG. 2, one example of the cartridge 2 for use with the cartridge autoslide CS of this invention will be described. FIG. 2B is a side view of the cartridge 2 and FIG. 2D is a front view. The film 6 for projection and the magnetic tape 14 are disposed in the cartridge 2 above and below the line X-X' in FIG. 2D, respectively. A partition wall 2p (refer to FIGS. 2C and 2E) and the upper and lower members of the cartridge 2 are formed as a unitary structure. The upper part of the front of the cartridge 2 has formed therein a picture projecting window 70 substantially centrally thereof and a frame feeding window 71 at the right of the window 70, and the lower part of the front thereof has formed therein a capstan window 72, a magnetic head window 73 and a sensor contact window 74 sequentially arranged from left to right relative to FIG. 2D. The film 6 and the magnetic tape 14 are housed, for example, in the form of endless loops in the cartridge. As depicted in FIG. 6, a film frame feeding signal or synchronizing signal is recorded on one track 52 of the magnetic tape 14 and predetermined aural signals such as explanation and music corresponding to the picture of each frame of the film 6 are recorded on the other track 51 in synchronism with the frame of the film 6. The film 6 is intermittently driven for each frame. The magnetic tape 14 has a sensor 39 as of a conductive foil (refer to FIGS. 2C and 2D) at one point on the endless loop, that is, at its start point, by which the tape 14 is automatically stopped as will be described later on. While, a first frame of the film 6 has, for example, a special color or pattern to allow ease in discriminating the first frame from the others and the film 6 is adapted so that the first frame corresponds to the start point of the magnetic tape 14. Through the window 70 and the windows 72 to 74 in the front of the cartridge 2, the first frame of the film 6 and the start point of the magnetic tape 14 can be observed simultaneously, by which it is possible to easily confirm synchronization of the film 6 with the magnetic tape 14. In FIG. 2D reference 6d designates a discriminating frame which will be described later on.

In general, it is desirable, from the viewpoint of reduction in size of an apparatus employed, to use an 8mm film in an autoslide for home use or the like but this film has not yet been realized. In an 8mm projector, the magnification of a picture is selected in excess of its limit as compared with the size of a silver particle in an emulsion layer on the film and the thickness of the layer from the economical point of view but, in the case of a motion picture, 18 to 24 frames or scenes are sequentially projected in one second, so that the position and roughness of an enlarged image of the silver particle become unnoticeable due to the after-image effect. On the contrary, in the case of a slide, each frame is left stationary for a relatively long period of time, so that roughness caused by the silver particle of the film is noticeable.

Figure 5:
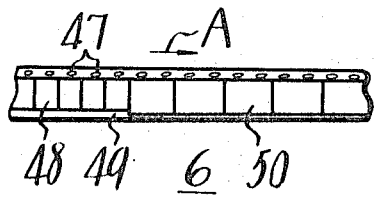
FIG. 5 is a front view of a film housed in the cartridge.

In the present invention, each frame of the film 6 has a transverse longer side in the lengthwise direction of the film and a vertical shorter side perpendicular thereto. FIG. 5 shows one example of the film 6, in which the picture plane 50 of one frame is formed corresponding to two perforations 47 of one frame of a usual 8mm film. For the purpose of comparison, usual 8mm picture planes 48 and a sound track 49 are shown at the left of FIG. 5. In the case of the conventional 8mm picture plane, each frame of the film has a vertical shorter side in the lengthwise direction A of the film and a transverse longer side perpendicular thereto. Accordingly, the picture plane is turned through 90° as compared with that in this invention. Next, a comparison of the areas of both picture planes shows that the usual picture plane 48 is about $4 \times 5.6 mm^2$ and that the picture plane 50 of this invention is about 6 33 8mm², which is more than twice the area of the former. If the brightness of a projector lens, the distance between the film and the screen and the size of the screen, that is, the magnification are selected the same, roughness of the silver particles of this invention fall within a tolerable range and high resolution can be obtained. Further, the focal distance of the projector lens can be selected 1.5 times in this invention, which provides for increased focal depth, and hence leads to an advantage in that defocusing due to frame feed and deformation of the film can be reduced.

As described previously, since an image need not be turned through 90° between the film picture plane and the screen 10, the reflector mounting mechanism can be simplified.

Turning now to FIG. 2A, the film housing portion of the cartridge 2 according to this invention will be described. As shown in the figure, a pinch roller 21 is mounted at one end of a rotary arm 22 which is pivoted at the other end to the cartridge 2. A spring 22S is stretched between the arm 22 and the fixed part of the cartridge 2 to push the pinch roller 21 forwardly in the direction of an arrow $a_1$ at all times. Reference numeral 23 identifies a press plate which is provided in the cartridge 2 at a position corresponding to the window 70 for pressing the film 6 to left in the figure. To this end, springs 23S are stretched between both ends of the press plate 23 and fixed parts of the cartridge. The film 6 is drawn across the press plate 23 and the pinch roller 21 and past a film reservoir $F_1$ connected in the form of an endless loop. When the cartridge 2 is loaded in the autoslide CS, the press plate 23 and the pinch roller 21 are respectively urged against a film gate 25 having projections corresponding to the window 70 and a sprocket 24. As the sprocket 24 is turned clockwise in direction $a_2$ as shown, the film 6 is driven in the direction of the arrow $a_3$.

Figure 4:
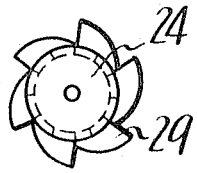
FIG. 4 is a top plane view of a sprocket and a ratchet cam.

In FIG. 2B, reference numeral 26 designates a depression formed in the side wall of the tape housing portion of the cartridge 2, that is, below the center line in the direction of the thickness of the cartridge 2 in the figure (refer to FIG. 2C). Since the depression is formed on the side of the tape housing portion of the cartridge under the line X-X' (refer to FIG. 2D), the cartridge 2 cannot be inserted in the autoslide CS upside down. Reference numeral 27 represents a base plate which is provided on the inside of the autoslide CS and on which the cartridge 2 is loaded. Reference numeral 28 indicates a bearing for the sprocket 24, 29 a ratchet cam affixed to the lower part of the sprocket shaft for regulating the rotational angle of the sprocket 24, and 31 a plate spring by means of which a ball 30 attached to the free end of a rod 30a and fixed at its other end to the base plate is urged into engagement with radial depressions (described later) formed in the upper surface of the ratchet cam 29. The number of teeth of the sprocket 24 and the ratchet cam 29 are selected, for example, 12 and 6 respectively, as illustrated in FIG. 4. Accordingly, upon generation of one frame feed signal from the magnetic tape 14, the ratchet cam 29 is driven one step to feed one frame corresponding to two perforations of the film 6.

Figure 7:
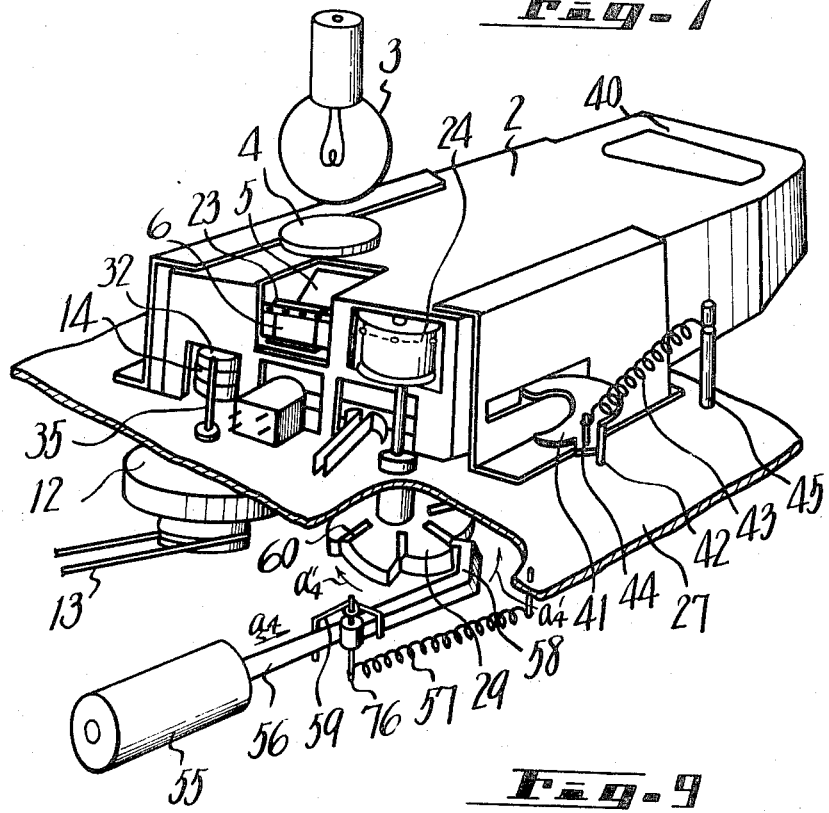
FIG. 7 is a perspective view partially in cross-section used for explaining for driving the film in accordance with the magnetic tape.

Next, a description will given with regard to FIG. 7. As depicted in the figure, the upper surface of the ratchet cam 29 has formed therein groove-like depressions 60 at angular intervals of 60° radially thereof and, as shown in FIG. 2B, the ball 30 is urged by the plate spring 31 against the upper surface of the ratchet cam 29. Upon energization of a plunger coil 55 with the frame feed signal, an iron core 56 is pulled inside of the coil 55 against the tensile force of a spring 57 stretched between the base plate 27 and the iron core 56 to pull the latter in the direction of an arrow $a_4$ at all times. At the same time, the iron core 56 is pushed in the direction of an arrow $a'_4$ by a spring 59 rotatably mounted on a pin 76 disposed at the outer end of the iron core 56 to pull a hook 58 engaging the pawl of the ratchet cam 29, so that the ratchet cam 29 is turned by one step, that is, through 60° in the direction of arrow $a''_4$. Since the frame feed signal is selected to become extinguished before the end of the above operation, the ball 30 falls in the corresponding depression 60 to hold the rotational angle of the ratchet cam 29 correctly at 60° and retain the ratchet cam 29 at that position. Corresponding to the above operation, two teeth of the sprocket 24 engage perforations of the subsequent frame to drive the film 6 by one frame and retain that frame correctly at the picture projecting window 70. The above operations are repeated for each frame feed signal.

The interior surface of the front panel of the cartridge 2 has formed therein the picture projecting window 70 and has two inward projections 75 (refer to FIGS. 2A and 2E). The distance between the two projections 75 is selected to be an integral multiple of adjacent ones of the perforations. As illustrated in FIG. 2E, when the cartridge 2 is removed from the autoslide CS, the film gate 25 and the sprocket 24 are disengaged from the front of the film 6, so that the film 6 is pushed forwardly by the spring 23S with the press plate 23 interposed therebetween and urged against the front panel of the cartridge 2 and, at this time, the perforations 47 of the film 6 receive the projections 75 to lock the film 6 at that position. If the film 6 gets out of position due to vibration and so on to the cartridge 2 from hitting the film 6 with a finger when the cartridge is removed therefrom, there is the possibility that the teeth of the sprocket 24 will get out of the perforations 47 of the film 6 to damage the latter or cause the synchronization with the magnetic tape 14 to become lost thereby causing the cartridge 2 to be inoperative. However, the provision of the projections 75 eliminates accidental movement of the film 6 which is a primary cause of loss of synchronization. Further, when the cartridge 2 is loaded in the autoslide CS, the film 6 is pushed by the projecting face of the film gate 25 into the cartridge 2, and hence moved inwardly together with the press plate 23 to be disengaged from the projections 75. The length of each projection 75 is selected appropriate to cause the teeth of the sprocket 24 to engage the perforations of the film 6 before disengagement of the film 6 from the projections 75, thereby preventing the film 6 from moving out of its defined position.

In the present invention two projections 75 are employed but either one of them may be left out. Further, the sprocket 24 is used as a film drive mechanism in this example, but may be replaced with claws as in a cine-camera or projector. In such a case, however, it is a matter of course that the claws should be constructed to immediately engage with the perforations of the film in the cartridge upon loading of cartridge to retain the film at its predetermined position so as not to cause the synchronization with the magnetic tape to be lost, as the sprocket 24 is constructed so that its teeth stop at predetermined angular positions when the function of the autoslide CS is stopped.

Referring to FIG. 2C, the magnetic tape housing portion of the cartridge 2 will be described in connection with the case where the cartridge 2 is loaded in the autoslide CS. Reference numeral 26 designates the depressions for engagement with cams of a cartridge mounting and removing mechanism provided in the autoslide CS. Reference numeral 32 indicates a pinch roller for the magnetic tape 14 which is to inertia thereof and, in some cases, the sensor 39, that is the start point of the magnetic 2, and 33 a bobbin having a flange 34 attached to its lower end, on which the magnetic tape 14 passed around the pinch roller 32 and wound on the outer most convolution the tape, as indicated by an arrow $a_5$. Reference numeral 35 represents the capstan shaft carrying the flywheel 12 as depicted in FIG. 1, which shaft is driven counter-clockwise $a_6$ by the motor 11 through the belt 13 as shown. Reference numeral 15 indicates the magnetic head. The magnetic tape 14 is pressed by the pad 36 against the gap surface of the magnetic head 15. Reference numeral 38 identifies contacts which are shorted by the sensor 39 and engage the tape 14 through the window 74 formed in the front panel of the cartridge 2. The magnetic tape 14 is adapted to be automatically stopped by shorting of the contacts 38 but the flywheel 12 continues rotation due to inertia thereof and, in some cases, the sensor 39, that is, the start point of the magnetic tape 14 stops past the position of the contacts 38, for example, in the neighborhood of the pinch roller 32.

In FIG. 2C, reference character TL indicates generally a tape lock mechanism by means of which the tape 14 is prevented from being moved by impact applied thereto, such as manual operation through the windows 72 to 74 when it is not driven and which would cause the synchronization with the film 6 to be lost. The tape lock mechanism TL comprises, in the example of the side view of the cartridge 2, an arm TL2 pivoted to a shaft TL1 in the vicinity of the window formed in the lower part of the cartridge 2, a projection TL3 is mounted at one end of the arm TL2 and a leaf spring TL5 is mounted on a pin TL4 for biasing the projection TL3 of the arm TL2 into engagement with notches 34N formed at the periphery of the flange 34. In the case where the cartridge 2 is loaded in the autoslide CS as shown, a projecting end TL6 of the arm TL2 is pressed by a guide 46 (refer to FIG. 3) inwardly of the side wall of the cartridge 2 to disengage the projection TL3 on the opposite end of the arm TL2 from the notch 34N of the flange 34 to permit free rotation of the flange 34. When the cartridge 2 is unloaded from the autoslide CS, the projecting end TL6 of the arm TL2 is caused by the spring force of the leaf spring TL5 to project out from the cartridge 2 and the projection TL3 engages the notch 34N of the flange 34 to prevent the flange 34 from rotating and maintains it fixed. In FIG. 2C, reference character TL7 indicates a retaining piece such as a pad which is fixed to a projection TL8 provided on the arm TL2 on the side of projection TL3 and which is brought into contact with the outermost convolution of the tape 14 to prevent it from slackening when the cartridge 2 is unloaded from the autoslide CS. Of course, when the cartridge 2 is inserted into the autoslide CS, the retaining piece TL7 is disengaged from the outermost convolution of the tape 14 as depicted.

Figure 3A:
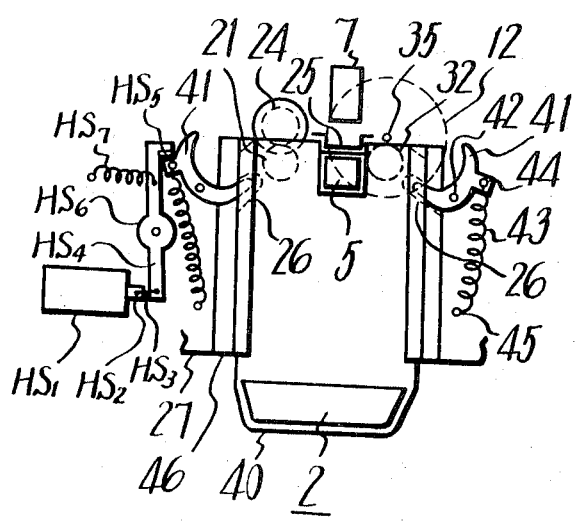
FIGS. 3A and 3B are schematic diagrams for illustrating an example of cartridge loading unloading mechanism according to this invention.
Figure 3B:
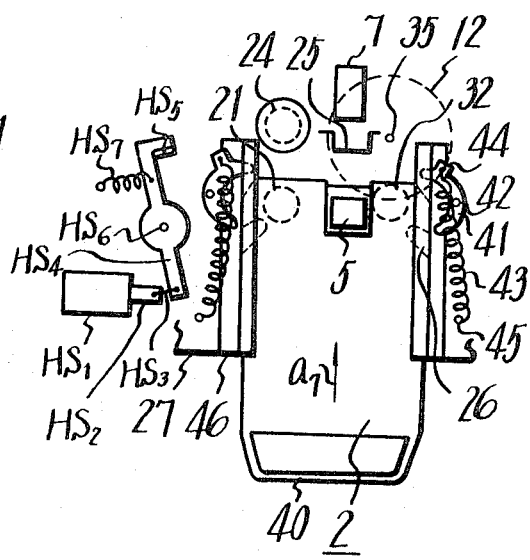

FIGS. 3A and 3B illustrate one example of a cartridge loading and unloading mechanism. In the figures, reference numeral 40 designates a handle of the cartridge 2, 5 the reflector mirror in the cartridge 2 as described previously, and 21 and 32 pinch rollers for the film 6 and the magnetic tape 14, respectively. Depressions 26, which are formed in both side walls of the cartridge 2 at positions corresponding to the tape 14, receive projections of loading and unloading cams 41 provided in the autoslide CS. The loading and unloading cams 41 are supported to be rotatable about pins 42, respectively. A spring 43 is stretched between one point 44 on each of the cams 41 and each spring retainer 45 on the base plate 27 to bias each cam 41 toward a point 45 at all times. As previously described, reference numeral 35 indicates the capstan shaft, 12 the flywheel mounted thereon, 7 the projector lens and 24 the sprocket. Reference numeral 46 identifies the pair of cartridge guides provided in the autoslide CS. As illustrated in FIG. 3A, when the cartridge 2 is inserted between the cartridge guides 46 in the direction of an arrow $a_7$, the right and left tips of the cartridge 2 engage the projections of the cams 41 on both sides to turn them about the pins 42 to engage the other projections of the cams 41 with the depressions 26 on both sides of the cartridge 2. When the points 44 on the cams 41 go beyond lines joining the pins 42 and the spring retainers 45 respectively, the cartridge 2 automatically advances due to the tensile force of the springs 43 upwardly in the figure and it is stopped at a position where the pinch roller 32 is urged against the capstan 35 with the magnetic tape 14 being gripped therebetween. At this time, the pinch roller 21 for the film 6 and the film press plate 23 in the cartridge 2 are respectively pushed inwardly by the sprocket 24 and the film gate 25 with the film 6 being gripped therebetween. Unloading of the cartridge 2 is achieved by pulling the handle 40 downwardly in the figure.

Figure 9:
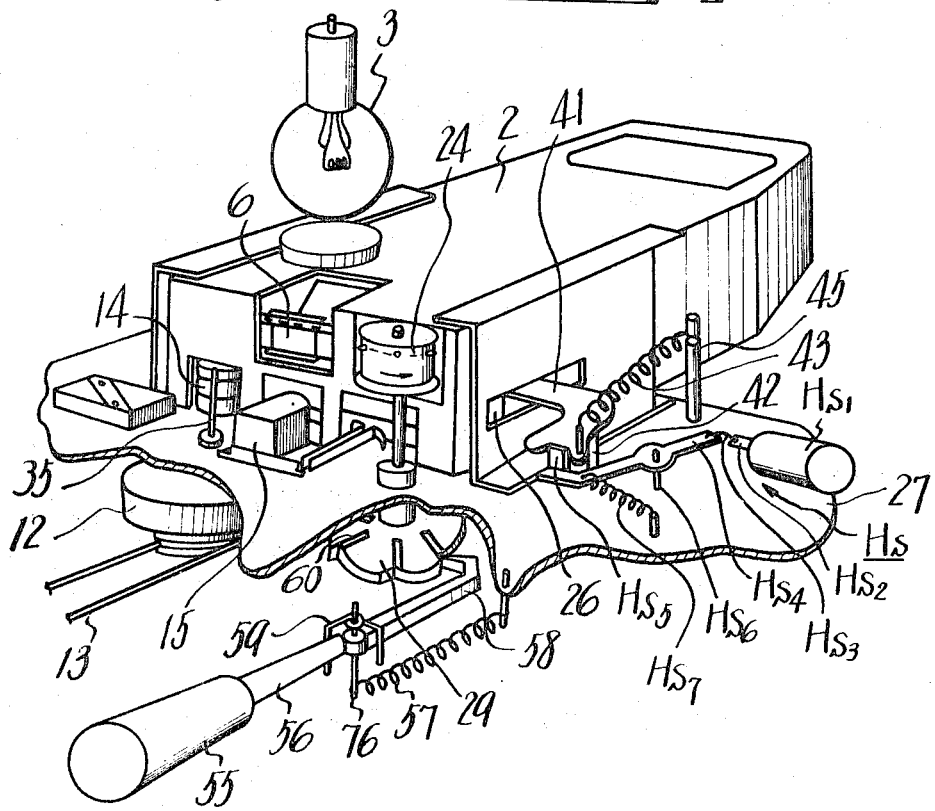
FIG. 9 is a perspective view, partially in cross-section, for explaining the mechanism for locking the cartridge when being driven.

Turning to FIG. 9, a description will be given of one example of a lock means HA which inhibits unloading of the cartridge 2 from the autoslide CS while the former is driven by the latter. In the figure, the same reference numerals as those in FIG. 7 denote corresponding elements and since they are substantially identical in construction and operation, no description will be repeated. The lock means HA comprises a solenoid HS1 connected to a power source circuit disposed on the base plate 27 in the housing 1 as indicated by a broken line in FIG. 8. An arm HS4 is coupled at one end with an iron piece HS2 of the solenoid HS1 and an engaging piece HS5 engageable with the cam 41 is mounted on the free end of the arm HS4. The arm HS4 is rotatably held at its intermediate portion by a pin HS6 planted on the base plate 27 and it is always biased to turn counterclockwise about the pin HS6 by a spring HS7 stretched between the base plate 27 and the end portion of the arm HS4 which has mounted thereon the engaging piece HS5.

Figure 8:
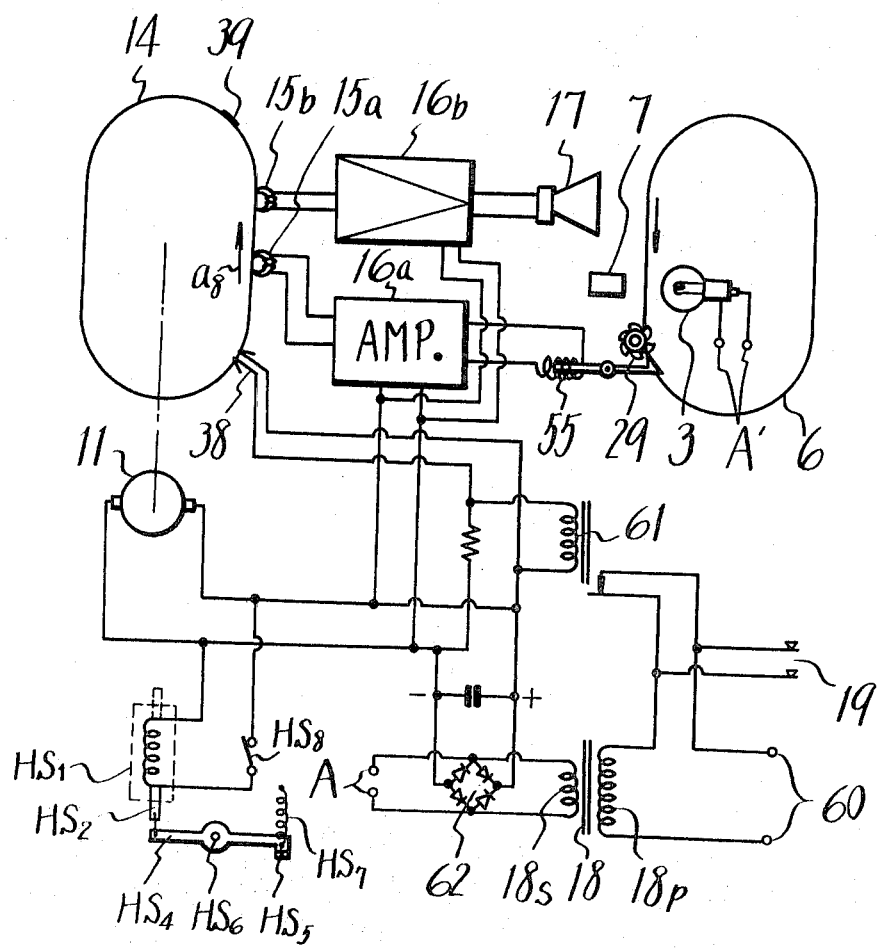
FIG. 8 is an electric circuit diagram of the cartridge autoslide.

Referring now to FIG. 8, the operation of the lock means HS will be described. By loading the cartridge 2 on the autoslide CS and pressing a start switch 19, the solenoid HS1 is energized to pull the iron piece HS2 into the solenoid HS1, that is, in the direction of arrow $a_9$ in FIG. 9, so that the arm HS4 is turned clockwise about the pin HS6. As a result of this, the engaging piece HS5 of the arm HS4 engages the cam 41 engaging the depression 26 of the cartridge 2, by which the rotation of the cam 41 is prevented, thus preventing unloading of the cartridge 2. In FIG. 8, reference HS8 represents a switch which may be provided on the housing 1 of the slide CS. When the switch is opened, the solenoid HS, is deenergized to unlock the lock means HS even if the cartridge is driven. However, the switch HS8 may be provided at a position where it is not easily operated as to avoid erroneous operation.

Upon completion of drive of the cartridge 2, the solenoid HS1 is deenergized and the arm HS4 is turned counterclockwise about the pin HS6 by the spring force of the spring HS7. Consequently, the engaging piece HS5 is disengaged from the cam 41 to permit unloading of the cartridge 2.

If the cartridge 2 is unloaded from the autoslide CS when the frame signal recorded on the magnetic tape 14 passes over the front of the magnetic head 15 during travel of the tape 14, there is the possibility that when the cartridge 2 is subsequently loaded, the synchronization will be lost. To avoid this, it is also possible to provide a lock mechanism by which once the magnetic tape 14 starts travelling, unloading of the cartridge 2 is prevented until the tape 14 is stopped by the sensor 39.

In the present example, the cartridge 2 is locked by preventing the rotational movement of the cam 41 but it is also possible, of course, to prevent unloading of the cartridge by forming a depression in the cartridge 2 and engaging the piece HS5 therewith.

It will be apparent that when the cartridge 2 is inserted in the autoslide CS, the lock mechanism for the tape 14 is also automatically released by the guides 46.

FIG. 6 is a diagram showing the arrangement of tracks on the magnetic tape 14. On the left side of the line A—A, a frame feed signal track 52 and one sound track 51 are formed on the tape 14, while, on the right side of the line A—A, two sound tracks 53 and 54, for example, for the Japanese and English languages are formed for the same picture for language study. It will be seen that the number of the tracks can be increased or decreased, if desired.

FIG. 8 shows primarily the electric circuit. The magnetic tape 14 is driven by the motor 11 in the direction of arrow $a_8$. The contacts 38 may be shorted by the passage thereon of the sensor 39. In FIG. 8, reference numerals 15a and 15b designate magnetic heads for the frame feed signal and the aural signal respectively, which drive the speaker 17 and the plunger 55 through amplifiers 16a and 16b, respectively. The primary winding 18p of a transformer 18 is connected to a power source 60 and its secondary winding 18s is connected to the power source 60 through a contact of a relay 61 (the start switch 19 being connected in parallel with the contact). Short-circuit contacts 38 are connected in parallel with the coil of the relay 61. The secondary side 18s of the transformer 18 has connected thereto the light source lamp 3 (the connection between A and A' being omitted) and a rectifier 62. DC current from rectifier 62 passes through a smoothing circuit and is supplied to the motor 11 and the amplifier 16. By depressing the start switch 19, the relay 61 is actuated to close its contact and even if the depressing force applied to the start switch 19 is removed, the power source circuit is held conductive to light the lamp 3 and will the motor 11 to drive the magnetic tape 14, by which sound recorded thereon is reproduced from the speaker 17 and the frame feed signal recorded on the other track of the tape 14 actuates the plunger 55 to feed the frame of the film 6. Assuming that the number of the frames of the film 6 and that of the frame feed signals on the magnetic tape 14 are equal to each other, the film 6 makes a round of its travel to project all of the frames through the projector lens 7 in a sequential order until the sensor 39 short-circuits the contacts 38 to deenergize the relay 61 to turn off the lamp 3 and the entire operation is stopped. After starting of the magnetic tape 14. If it is arranged so that the magnetic tape 14 and the frames of the film 6 at the standstill position are starting points for recording of sound and picture, respectively, corresponding pictures and sounds are projected on the screen and reproduced from the speaker, respectively, by depressing the start switch 19 after loading the cartridge 2 and, upon completion of the projection and reproducing, the entire operation is stopped.

The autoslide CS is constructed so that while the motor 11 drives the magnetic tape 14, the solenoid coil HS1 (in FIG. 9) is also energized to utilize biasing of the iron core HS2 for preventing unloading of the cartridge 2, as described previously.

With the present invention described above, while the cartridge 2 is not loaded in the autoslide CS, the film 6 is locked at its normal position with respect to the picture projecting window and, while the cartridge 2 is loaded, the film 6 is unlocked after the teeth of the sprocket engage the perforations 47 of the film 6 and, the ratchet cam 29 for driving the sprocket 24 is rotated correctly through a predetermined angle and fixed at its rotational position and the tape 14 is also locked at a predetermined position, so that the teeth of the sprocket 24 always holds the picture frame of the film 6 at its normal position with respect to the picture projecting window. Further, the provision of the cartridge unloading inhibit mechanism eliminates the possibility that the synchronization between the film picture frame and the control or film feeding signal and the sound recorded on the magnetic tape 14 will be lost due to loading and unloading of the cartridge 2. Further, in the case of using a usual 8mm film, the picture area of each frame can be increased more than twice that of the usual one to provide for enhanced resolution which could not have been obtained in the past. Accordingly, the cartridge 2 and the autoslide CS can be made extremely small in size with a sharp picture and can be fool-proof. Further, in the fabrication process, adjustment for mounting of the reflectors in simplified to provide for enhanced efficiency, which can be said to be a great advantage of this invnetion. With this invention the area of each frame of the film is about twice as that of the conventional film, and flaws, dust and the like do not effect the results.

There are some occasions when the number of picture frames is so small that the film cannot be made endless, and the film is connected in an endless form so that a plurality of sets of films containing the same picture frame arrangements are repeatedly projected for the purpose of prolonging the liftime of the film, and the number of frame feed signals on the magnetic tape does not always correspond to one set of picture frames, and the same explanation, music or the like is composed of a plurality of sets and a plurality of automatic stopping means are employed.

Especially when the time for the tape is extremely short, it is difficult to handle the remaining blank portion of the tape and its lifetime is shortened, so that it is recommended that a plurality of sets of magnetic tapes be used.

These modifications and variations do not depart from the scope of the present invention.

Referring now to FIGS. 10 to 14, other examples of the cartridge according to this invention will be described. In these figures, parts corresponding to those in the prior figures are marked with like reference numerals and characters and no description will be given thereof because they are substantially identical in construction and in operation with each other.

Figure 10:
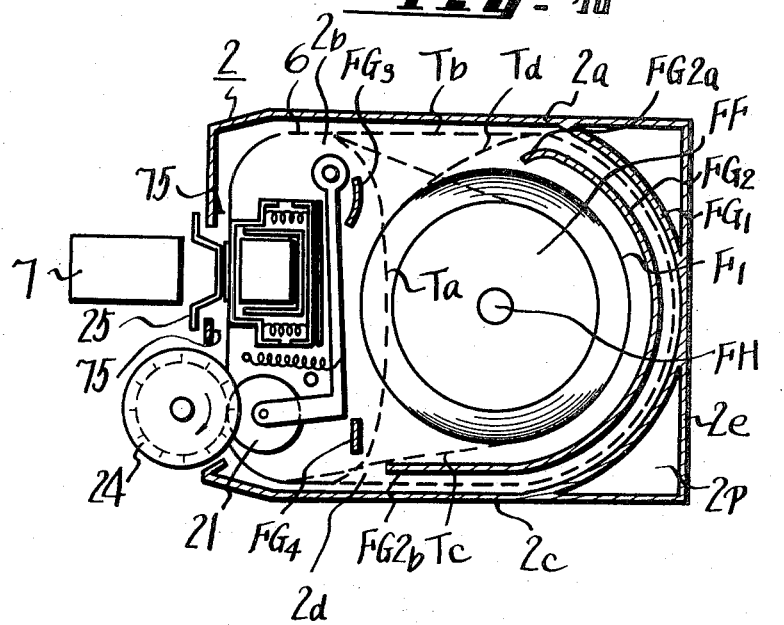

In the example of FIG. 10, a pair of film guides FG1 and FG2 are provided in the rear portion $F_1$ (in the right-hand portion in the figure) of the cartridge 2 housing the film 6 therein and the film 6 is passed between both film guides. An arc-shaped guide wall FG3 forming a film outlet port 2b is formed and spaced slightly apart from a side panel 2a of the cartridge 2 on the film off-running side. A guide wall FG4 forming a film inlet port 2d is formed a small space from a side panel 2c on the film incoming side. Further, in the film housing portion $F_1$ defined by the side panels 2a and 2c and a rear panel 2e of the cartridge 2, the aforesaid semicircular outer guide wall FG1, secured at both ends to the side panels 2a and 2c and at its apex to the rear panel 2e, is provided and the substantially semicircular inner guide wall FG2 coaxial with the outer guide wall FG1 is disposed inside of the outer guide wall FG1 with a small space relation thereto. The end portion FG2a of the inner guide wall FG2 on the film outlet port 2b is extended to turn the direction of the film by about 180° and the end portion FG2b of the inner guide wall FG2 extends to the neighborhood of the film inlet port 2d in parallel and spaced close to the side panel 2c. Further, a shaft $FF_1$ is planted on the partition wall 2p at its center in the portion $F_1$ and a roller FF is rotatably supported by the shaft $FF_1$. With such a construction, the endless films of various lengths can be driven smoothly by the use of a small cartridge to some extent. If the film housing portion $F_1$ of the cartridge 2 for use with an autoslide, for example, for an 8mm film has dimensions of, for example, about 62mm × 62mm, and when the film is short, for example, the number of frames of the film is twenty, the film can be housed as indicated by a broken line Ta in FIG. 10. In the case of 30 frames, the film can be housed as indicated by a broken line Tb. In this case, when the film 6 is short, it may be caused to travel from the film inlet port 2d directly to the film outlet port 2b and when the film 6 is rather long, it travels along the guide walls FG1 and FG2 and the film 6 runs while being held in this condition, so that the picture frames of the film can be fed smoothly. When the film to be received is longer, it is loosely wound on the roller FF and it is led out from the inner convolution to travel through the front portion of the cartridge and to be wound on the outer periphery of the convolution as an endless loop shown by Te. If the film is still longer, the film led out from the inner convolution and is wound on its outer periphery through the front portion of the cartridge and between the film guide walls FG1 and FG2 as shown by Td.

Figure 11:
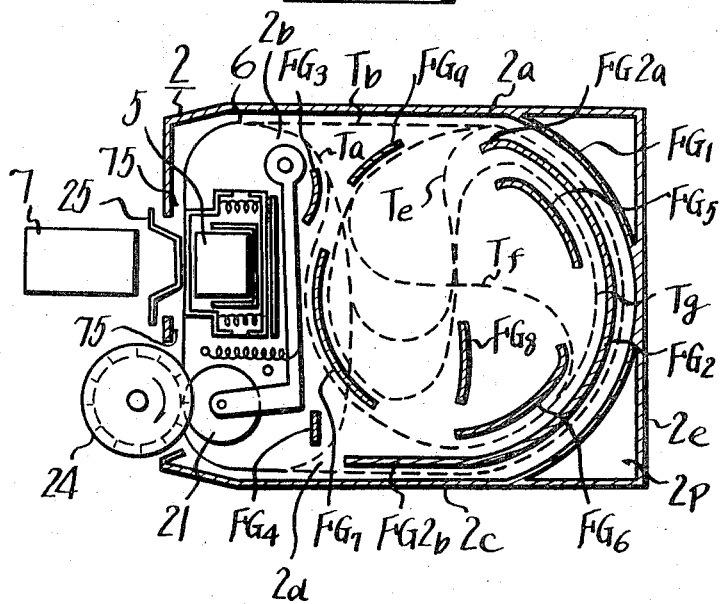

The cartridge 2 shown in FIG. 11 is designed to prevent that the radius of curvature of the film 6 of considerable length from in the cartridge 2 becoming so small the film to curl or provide frictional areas which rub with each other to damage the film. In this example, two guide walls FG5 and FG6 are further disposed inside of the inner guide wall FG2 and a guide wall FG7 is provided on the opposite side therefrom to prevent nutual contact of respective parts of the film 6. Further, another guide wall FG8 is disposed between the guide walls FG5 and FG6 and FG7 below the central portion. Moreover, a guide wall FG9 is disposed near the guide wall FG3.

With the arrangement shown in FIG. 11, even when the film 6 is appreciably long, if it is previously trained around the respectively guide walls as depicted in the figure, it travels without causing mutual contacts of its respective parts and, in addition, appropriate provision of the guide walls eliminates the possibility that the radius of curvature of the curved tape will be extremely small. Accordingly, the film is smoothly driven without mutual contact friction and curling. When the number of frames of the film is 20, 30, 40, 50 and 60, the film path in the cartridge is shown by Ta, Tb, Te, Tf and Tg, respectively.

Further, some of the guide walls depicted in FIG. 11 may be replaced with rollers shown in FIG. 12. Namely, the guide walls FG5 and FG6 can be replaced with rollers FG11 and FG12 rotatably mounted on shafts FG11a and FG12a respectively. Further, a roller FG13 having a shaft FG13a may also be disposed between the roller FG12 and the guide wall FG7 as indicated by a broken line in FIG. 12, in which case the guide wall FG8 is left out. Where the film 6 is somewhat short, the guide roller FG13 can be omitted. Further the other guide walls except those FG1 aNd FG2 may be replaced with other rollers.

FIG. 13 shows the case where the cross section of the base FG5a of the guide wall FG5 is formed a little wider than that of its upper part and the film 6 is guided with its lower marginal edge in contact with the enlarged portion, by which the portion of the picture frame of the film is kept away from the guide wall. The other guide walls may preferably be formed similarly.

In FIG. 14, a groove FG11b is formed in the peripheral surface of, for example, the roller FG11 and the film 6 makes contact with its upper and lower raised peripheral surfaces to obtain the same result as that obtainable with the above construction. It is preferred to form the other rollers similarly.

It will be apparent that many modifications and variations may be effected without departing from the scope of the novel concepts of this invention.

I claim as my invention:

1. A film cartridge for an autoslide and audio player comprising an endless film having a plurality of frames on each of which a picture is formed, each frame being formed of two conventional 8mm film frames and the transverse longer side of the frame extends lengthwise of the film, an endless magnetic tape with audio signal and film feeding signals recorded thereon in synchronism with frames of said endless film, a housing having two portions separated by a partition wall for accommodating therein said endless film and said endless magnetic tape, respectively, a plurality of windows formed in said housing for exposing said endless film and magnetic tape therethrough, a reflector for projecting light passing through the endless film, first locking means for automatically locking said endless film and said magnetic tape so as to maintain synchronization therebetween when the cartridge is removed from the autoslide and player, said first locking means for the audio tape including a gear with teeth coupled to said magnetic tape, a lever mounted for engaging the gear to lock it when said cartridge is removed from said player and which extends through an opening of said cartridge and is moved by said player to disengage the lever from said gear when the cartridge is inserted into said player, and second locking means is provided on the housing of the cartridge for locking the cartridge to the cartridge autoslide and player while said magnetic tape is being driven.

2. A film cartridge according to claim 1 in which said first locking means for locking said endless film also includes a pin mounted on the housing of the film cartridge at the front inside portion of said housing, and said pin engaging perforations on said endless film when said cartridge is removed from the cartridge autoslide and player.

3. A film cartridge according to claim 2 in which film guide means is provided in said housing so as to reverse the film travelling direction by about 180°.

4. A film cartridge according to claim 3 in which a second film guide means is provided to guide the film and for restricting the film and the film travelling path and for preventing contact between portions of the film travelling in opposite directions.

5. A film cartridge according to claim 4 in which said second film guide means is a roller.

6. A film cartridge according to claim 1 in which at least one depression is formed outside of the housing for positioning the cartridge in the autoslide.

7. A film cartridge according to claim 6 in which there are two depressions which are formed on the sides of the housing asymmetrical with respect to the partition wall for preventing the erroneous insertion of the cartridge, and one of the depressions has a relationship to second locking means, whereby the correct position of the cartridge is assured.

8. A film cartridge according to claim 1 in which pinch rollers for driving the endless film and magnetic tape are disposed in the housing at opposite sides with respect to a center line of the housing, and said endless film and said magnetic tape travel in opposite directions.

9. A film cartridge according to claim 8 in which said endless film has a start discriminating frame and said endless magnetic tape has a visible sensing means at its starting point for providing automatic stop, said start discriminating frame and sensing means being visible through said windows whereby the synchronization between the endless film and magnetic tape can be visibly ascertained from outside said housing.

* * * * *